US012585894B2

(12) United States Patent (10) Patent No.: US 12,585,894 B2
Kim et al. (45) Date of Patent: Mar. 24, 2026

(54) ELECTRONIC APPARATUS AND METHOD FOR MACHINE TRANSLATION

(71) Applicant: SAMSUNG ELECTRONICS CO., LTD., Suwon-si (KR)

(72) Inventors: Joonghoon Kim, Suwon-si (KR); Sangha Kim, Suwon-si (KR); Jiwan Kim, Suwon-si (KR); Sangil Park, Suwon-si (KR); Sohyun Park, Suwon-si (KR); Taehwan Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/369,584

(22) Filed: Sep. 18, 2023

(65) Prior Publication Data

US 2024/0160862 A1 May 16, 2024

Related U.S. Application Data

(63) Continuation of application No. PCT/KR2023/011421, filed on Aug. 3, 2023.

(30) Foreign Application Priority Data

Nov. 16, 2022 (KR) ........................ 10-2022-0153680

(51) Int. Cl.
*G06F 40/58* (2020.01)
*G06F 40/253* (2020.01)
(Continued)

(52) U.S. Cl.
CPC ............ *G06F 40/58* (2020.01); *G06F 40/253* (2020.01); *G06F 40/40* (2020.01); *G06F 40/42* (2020.01); *G06F 40/51* (2020.01); *G06F 40/56* (2020.01)

(58) Field of Classification Search
CPC .......... G06F 40/58; G06F 40/40; G06F 40/42; G06F 40/51; G06F 40/56; G06F 40/253
See application file for complete search history.

(56) References Cited

U.S. PATENT DOCUMENTS 6,374,224 B1 * 4/2002 Horiguchi ............... G10L 15/26
704/277
8,050,906 B1 * 11/2011 Zimmerman ........... G06F 40/47
704/4
(Continued)

FOREIGN PATENT DOCUMENTS

JP 4298771 B2 7/2009
JP 2013-196493 A 9/2013
(Continued)

OTHER PUBLICATIONS

Tillmann et al. "Word reordering and a dynamic programming beam search algorithm for statistical machine translation." Computational linguistics 29.1 (2003): 97-133. (Year: 2003).*
(Continued)

*Primary Examiner* — Samuel G Neway
(74) *Attorney, Agent, or Firm* — Sughrue Mion, PLLC

(57) ABSTRACT

An electronic apparatus includes a memory configured to store instructions, and a processor configured to execute the instructions to receive a text of a first language, generate, based on the text of the first language, style information indicating a translation style to be applied to the text of the first language and machine-translate the text of the first language into text of a second language based on the generated style information.

20 Claims, 10 Drawing Sheets

(51) Int. Cl.

| | |
|---|---|
| *G06F 40/40* | (2020.01) |
| *G06F 40/42* | (2020.01) |
| *G06F 40/51* | (2020.01) |
| *G06F 40/56* | (2020.01) |

(56) References Cited

U.S. PATENT DOCUMENTS

| | | | |
|---|---|---|---|
| 9,262,411 | B2 | 2/2016 | Woodward et al. |
| 9,971,769 | B2 | 5/2018 | Shin et al. |
| 10,380,264 | B2 | 8/2019 | Lee |
| 10,902,216 | B2 | 1/2021 | Lee et al. |
| 11,741,190 | B2 * | 8/2023 | Goyal ..................... G06F 40/30 704/9 |
| 12,093,659 | B2 | 9/2024 | Duan et al. |
| 2006/0217959 | A1 * | 9/2006 | Saito ........................ G06F 40/40 704/2 |
| 2007/0294077 | A1 * | 12/2007 | Narayanan ........... G06F 40/284 704/2 |
| 2013/0117008 | A1 * | 5/2013 | Condie ................... G06F 40/58 704/2 |
| 2013/0297284 | A1 | 11/2013 | Choi et al. |
| 2015/0286634 | A1 * | 10/2015 | Shin ........................ G06F 40/30 704/2 |
| 2017/0337189 | A1 | 11/2017 | Shin et al. |
| 2018/0046618 | A1 | 2/2018 | Lee et al. |
| 2020/0074981 | A1 * | 3/2020 | Chae ........................ G10L 25/63 |
| 2021/0312122 | A1 * | 10/2021 | O'Donncha ............ G06F 40/30 |
| 2023/0274100 | A1 * | 8/2023 | Garcia .................. G06F 40/166 715/229 |
| 2024/0160862 | A1 * | 5/2024 | Kim ...................... G06F 40/284 |

FOREIGN PATENT DOCUMENTS

| | | |
|---|---|---|
| KR | 10-2005-0064575 A | 6/2005 |
| KR | 10-0559473 B1 | 3/2006 |
| KR | 10-2012-0086037 A | 8/2012 |
| KR | 10-2013-0123038 A | 11/2013 |
| KR | 10-2018-0017622 A | 2/2018 |

OTHER PUBLICATIONS

International Search Report (PCT/ISA/210) issued on Nov. 23, 2023 by the International Searching Authority in International Patent Application No. PCT/KR2023/011421.

Written Opinion (PCT/ISA/237) issued on Nov. 23, 2023 by the International Searching Authority in International Patent Application No. PCT/KR2023/011421.

Extended European Search Report issued Sep. 30, 2025 by the European Patent Office for EP Patent Application No. 23891763.7.

* cited by examiner

FIG. 1

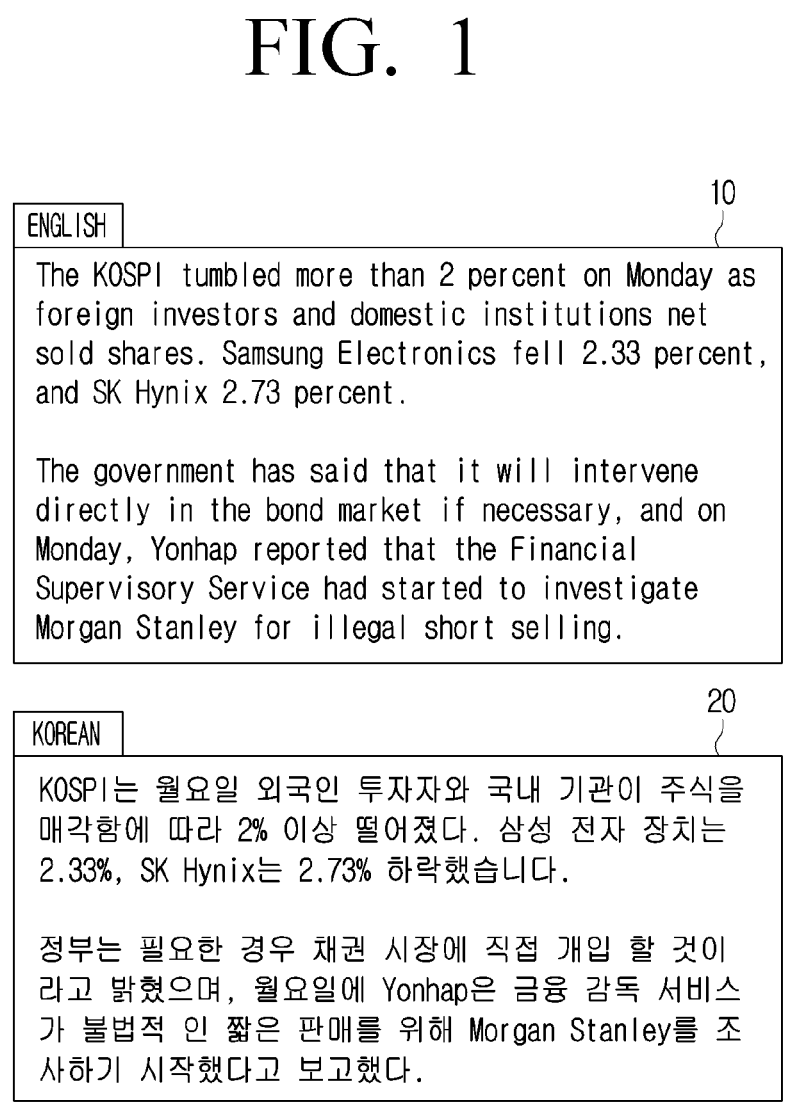

ENGLISH                                                                      10

The KOSPI tumbled more than 2 percent on Monday as
foreign investors and domestic institutions net
sold shares. Samsung Electronics fell 2.33 percent,
and SK Hynix 2.73 percent.

The government has said that it will intervene
directly in the bond market if necessary, and on
Monday, Yonhap reported that the Financial
Supervisory Service had started to investigate
Morgan Stanley for illegal short selling.

KOREAN                                                                       20

KOSPI는 월요일 외국인 투자자와 국내 기관이 주식을
매각함에 따라 2% 이상 떨어졌다. 삼성 전자 장치는
2.33%, SK Hynix는 2.73% 하락했습니다.

정부는 필요한 경우 채권 시장에 직접 개입 할 것이
라고 밝혔으며, 월요일에 Yonhap은 금융 감독 서비스
가 불법적 인 짧은 판매를 위해 Morgan Stanley를 조
사하기 시작했다고 보고했다.

| English |
| --- |
| The Kospi tumbled more than 2 percent on Monday as foreign investors and domestic institutions net sold shares. Samsung Electronics fell 2.33 percent, and SK Hynix 2.73 percent.<br><br>The government has said that it will intervene directly in the bond market if necessary, and on Monday, Yonhap reproted that the Financial Supervisory Service has started to investigate Morgan Stanley for illegal short selling. |

820

| Korean |
| --- |
| 외국인 투자자와 국내 기관들이 주식을 순매도하면서 코스피 지수는 월요일에 2% 하락했다. 삼성전자는 2.33%, SK하이닉스는 2.73% 하락했다.<br><br>정부는 필요할 경우 채권시장에 직접 개입하겠다고 밝혀왔고, 월요일에는 금융감독원이 모건스탠리에 대한 불법 공매도 조사에 착수했다고 연합뉴스가 보도했다.<br><br>한국은 지난 5월 조 바이든 대통령이 방문했을 때 "근본이 강하다"며 미국과 스와프 협정을 논의할 때가 아니라고 봤다. 지난 7월 재닛 옐런 재무장관이 방한했을 때 양국은 통화시장 안정에 협력하기로 했다. |

ELECTRONIC APPARATUS AND METHOD FOR MACHINE TRANSLATION

CROSS-REFERENCE TO RELATED APPLICATIONS

This application is continuation application of International Application No. PCT/KR2023/011421, filed on Aug. 3, 2023, which is based on and claims priority to Korean Patent Application No. 10-2022-0153680, filed on Nov. 16, 2022, in the Korean Intellectual Property Office, the disclosures of which are incorporated by reference herein in their entireties.

BACKGROUND

1. Field

This disclosure relates to an electronic apparatus and a method for performing machine translation.

2. Description of the Related Art

Machine translation may refer to the translation, by use of a computer, of a natural language used by humans into another language.

In related art machine translation, the translated sentences often have unnatural tones.

SUMMARY

Provided is an electronic apparatus and method for performing machine translation by maintaining a style of sentences.

Additional aspects will be set forth in part in the description which follows and, in part, will be apparent from the description, or may be learned by practice of the presented embodiments.

According to an aspect of the disclosure, an electronic apparatus may include a memory configured to store instructions, and a processor configured to execute the instructions to receive a text of a first language, generate, based on the text of the first language, style information indicating a translation style to be applied to the text of the first language and machine-translate the text of the first language into text of a second language based on the generated style information.

The text of the first language may include a plurality of sentences and the processor may be configured to execute the instructions to generate the style information based on the plurality of sentences, the style information being commonly applied to machine translation of the plurality of sentences.

The processor may be configured to execute the instructions to distinguish a first sentence of a first style and a second sentence of a second style based on a predetermined symbol included in the text of the first language or a text layout, generate first style information to be applied to the first style and second style information to be applied to the second style, translate a sentence of the first style into the second language based on the first style information, and translate a sentence of the second style based on the second style information.

The text of the first language may include a plurality of sentences, the processor may be configured to execute the instructions to generate the style information by generating third style information of each of the plurality of sentences and determining representative style information based on the third style information, and the processor may be configured to execute the instructions to machine-translate the text of the first language by identifying a similarity between the representative style information and the third style information, translating a sentence within a predetermined similarity range into the second language based on the representative style information, and translating a sentence outside the predetermined similarity range into the second language based on fourth style information of the sentence outside the predetermined similarity range.

The generated style information may include a style vector indicating at least one of a degree of honorific, a degree of formality, a degree of colloquialism, a degree of informativeness, and a degree of persuasiveness.

The processor may be configured to execute the instructions to determine a degree of honorific of the text of the first language based on words, final words and idioms included in the text of the first language, and machine-translate the text of the first language into the text of the second language based on the determined degree of honorific.

The processor may be configured to execute the instructions to classify, based on the text of the first language, a type of the text of the first language and generate the style information based on the classified type of the text of the first language.

The processor may be configured to execute the instructions to generate candidate sentences of the second language with respect to each sentence included in the text of the first language, generate fifth style information of each of the candidate sentences of the second language, and determine one of the generated plurality of candidate sentences as the text of the second language based on the fifth style information of each of the candidate sentences and sixth style information indicating the translation style.

The processor may be configured to execute the instructions to determine a plurality of candidate words or phrases included in the text of the first language, identify a style vector of each of the plurality of candidate words or phrases, and determine words or phrases to be applied to the text of the first language by comparing the style vector of each of the plurality of candidate words or phrases with the generated style information.

The text of the first language may include a plurality of paragraphs, each including a plurality of sentences, where the processor may be configured to execute the instructions to generate the style information in units of the plurality of paragraphs, and where the processor may be configured to execute the instructions to machine-translate the text of the first language into the text of the second language based on the generated style information that is generated in units of the plurality of paragraphs.

The electronic apparatus may include a display, and the processor may be configured to execute the instructions to control the display to display the text of the second language.

The electronic apparatus may include a communicator configured to receive text, and the processor may be configured to execute the instructions to control the communicator to transmit the text of the second language to an external device that has transmitted the text of the first language to the electronic apparatus.

According to an aspect of the disclosure, a method of an electronic apparatus may include receiving a text of a first language, generating, based on the text of the first language, style information indicating a translation style to be applied to the text of the first language, and machine-translating the text of the first language into text of a second language based on the generated style information.

The text of the first language may include a plurality of sentences, the generating the style information may include generating first style information of each of the plurality of sentences and determining representative style information based on the first style information, and the machine-translating may include identifying a similarity between the representative style information and the first style information of each of the plurality of sentences, translating a sentence within a predetermined similarity range into the second language based on the representative style information, and translating a sentence outside the predetermined similarity range into the second language based on second style information of the sentence outside the predetermined similarity range.

The generated style information may include a style vector indicating at least one of a degree of honorific, a degree of formality, a degree of colloquialism, a degree of informativeness, and a degree of persuasiveness.

The method may include determining a degree of honorific of the text of the first language based on words, final words and idioms included in the text of the first language and machine-translating the text of the first language into the text of the second language based on the determined degree of honorific.

The method may include classifying, based on the text of the first language, a type of the text of the first language and generating the style information based on the classified type of the text of the first language.

The method may include generating candidate sentences of the second language with respect to each sentence included in the text of the first language, generating third style information of each of the candidate sentences of the second language, and determining one of the generated plurality of candidate sentences as the text of the second language based on the third style information of each of the candidate sentences and fourth style information indicating the translation style.

The method may include determining a plurality of candidate words or phrases included in the text of the first language, identifying a style vector of each of the plurality of candidate words or phrases and determining words or phrases to be applied to the text of the first language by comparing the style vector of each of the plurality of candidate words or phrases with the generated style information.

According to an aspect of the disclosure, a non-transitory computer-readable recording medium may store instructions that, when executed by at least one processor, cause the at least one processor to receive a text of a first language, generate style information indicating a translation style to be applied to the text of the first language, and machine-translate the text of the first language into text of a second language based on the generated style information.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is a diagram illustrating a machine translation operation according to one or more embodiments;

FIG. 7 is a diagram illustrating a machine translation operation based on generated style information according to one or more embodiments;

FIG. 8 is a diagram illustrating an example of a generated machine translation result according to one or more embodiments;

DETAILED DESCRIPTION

Figure 2:
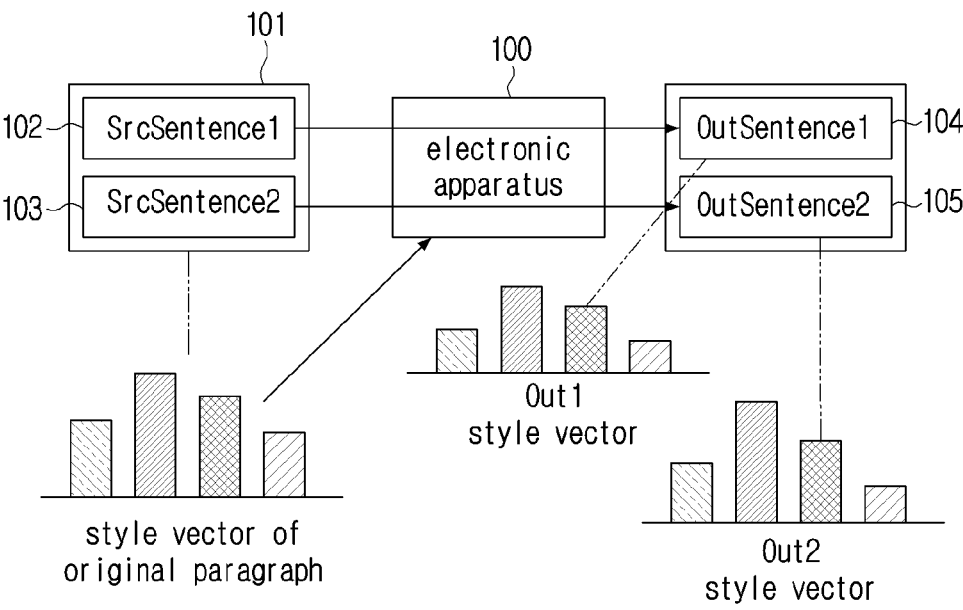
FIG. 2 is a diagram illustrating a machine translation operation according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. The terms including technical or scientific terms used in the disclosure may have the same meanings as generally understood by those skilled in the art.

In describing the disclosure, when it is decided that a detailed description for the known functions or configurations related to the disclosure may unnecessarily obscure the gist of the disclosure, the detailed description therefor will be omitted.

In addition, the following exemplary embodiments may be modified in several different forms, and the scope and spirit of the disclosure are not limited to the following exemplary embodiments. Rather, these exemplary embodiments make the disclosure thorough and complete, and are provided to completely transfer the spirit of the disclosure to those skilled in the art.

Terms used in the disclosure are used only to describe specific exemplary embodiments rather than limiting the scope of the disclosure. Singular forms are intended to include plural forms unless the context clearly indicates otherwise.

In the disclosure, an expression "have," "may have," "include," "may include," or the like, indicates existence of a corresponding feature (for example, a numerical value, a function, an operation, a component such as a part, or the like), and does not exclude existence of an additional feature.

In the disclosure, an expression "A or B," at least one of "A or/and B," "one or more of A or/B," or the like, may include all possible combinations of items enumerated together. For example, "A or B," "at least one of A and B," or "at least one of A or B" may indicate all of 1) a case in which at least one A is included, 2) a case in which at least one B is included, or 3) a case in which both of at least one A and at least one B are included.

Expressions "first", "second", "$1^{st}$," "$2^{nd}$," or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

On the other hand, when it is mentioned that any component (for example, a first component) is "directly coupled" or "directly connected" to another component (for example, a second component), it is to be understood that the other component (for example, a third component) may not present between any component and another component.

An expression "—configured (or set) to" used in the disclosure may be replaced by an expression "suitable for," "having the capacity to," "—designed to," "—adapted to," "—made to," or "~capable of" depending on a situation. A term "—configured (or set) to" may not necessarily mean "specifically designed to" in hardware.

Instead, an expression "—an apparatus configured to" may mean that the apparatus "is capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In exemplary embodiments, a "module" or a "unit" may perform at least one function or operation, and be implemented by hardware or software or be implemented by a combination of hardware and software. In addition, a plurality of "modules" or a plurality of "units" may be integrated in at least one module and be implemented by at least one processor except for a 'module' or a 'unit' that needs to be implemented by specific hardware.

Operations performed by the modules, the programs, or the other components according to the diverse embodiments may be executed in a sequential manner, a parallel manner, an iterative manner, or a heuristic manner, or at least some of the operations may be performed in a different order or be omitted, or other operations may be added.

Various components and areas in the drawings are schematically drawn. Therefore, the technical spirit of the present disclosure is not limited by the relative size or spacing drawn in the accompanying drawings.

The electronic apparatus according to one or more embodiments may include at least one of smartphones, tablet personal computers (PCs), desktop PCs, laptop PCs, or wearable devices. Here, the wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit.

According to some embodiments, the electronic apparatus may include at least one of refrigerators, air-conditioners, cleaners, ovens, microwave ovens, washing machines, air cleaners, set-top boxes, home automation control panels, security control panels, media boxes (e.g., Samsung Home-Sync™, Apple TV™, or Google TV™), game consoles (e.g., Xbox™ or PlayStation™), electronic dictionaries, electronic keys, camcorders, electronic picture frames, or the like. In addition to the above-described embodiments, an electronic apparatus according to the present disclosure may be any apparatus as long as it includes a display.

Hereinafter, an embodiment according to the present disclosure will be described in detail with reference to the accompanying drawings so that those skilled in the art can easily implement it.

FIG. 1 is a diagram illustrating a machine translation operation according to one or more embodiments.

Referring to FIG. 1, an original text 10 including a plurality of sentences and a translation area 20 for the original text are displayed.

Machine translation is a process of translating a source sentence displayed in a source language into another language designated by a user (i.e., a target language).

In general, when translating a text including a plurality of sentences, a machine translation operation may perform a translation work sentence-by-sentence. As such, the translation work is performed on a sentence-by-sentence basis and thus, there are cases in which the translation style may be different within a paragraph.

For example, as illustrated in FIG. 1, referring to the translation area 20 for the same newspaper article, it can be seen that the first sentence and the second sentence have different degrees of honorific (or polite expressions). Specifically, it can be confirmed that the first sentence is translated with honorific words in Korean, but the second sentence is translated into a language that does not have honorific words in Korean.

In addition, when translating the original text into another language, it is difficult to convey the nuance or tone of the original text.

Accordingly, a method of reflecting the nuance, tone, etc., of the original text and a method of collectively applying the above-described tone of voice in the process of translating a plurality of sentences are required.

Thus, the present disclosure provides a method of identifying the style of sentences included in the original text when translating a sentence and performing translation based on the identified style.

FIG. 2 is a diagram illustrating a machine translation operation according to one or more embodiments.

Referring to FIG. 2, when receiving a text of a first language, an electronic apparatus (i.e., a translator) 100 of the present disclosure identifies style information of the input text. The style information is a translation style applied to the text, and may include a style vector indicating at least one of a degree of honorific, a degree of formality, a degree of colloquialism, informativeness, and persuasiveness.

Specifically, the electronic apparatus 100 may identify style information of each of a plurality of sentences in a paragraph in order to reflect uniform translation or style of the original text, and determine representative style information to be used in translation. For example, when an input text 101 includes two sentences 102 and 103, a style vector of each of the first sentence and the second sentence may be calculated and a representative style vector to be commonly applied to the first sentence and the second sentence may be determined. In this case, the representative style vector may be determined using the average value of the style vector of the first sentence and the style vector of the second sentence or using the weighted average (e.g., the average reflecting weights according to a sentence order).

Alternatively, the representative style information to be applied to the corresponding text may be determined using the first sentence or a sentence designated by the user, or by identifying the type of text. As described above, the style information may include a plurality of style vectors and in implementation, may include only one style vector. The type of style vector other than the illustrated style vectors may be used. One example of a style vector used in the present disclosure will be described later with reference to FIG. 6.

As such, when the representative style information is determined, the electronic apparatus 100 may perform machine translation in units of sentences 104 and 105 using the determined style information. Referring to the illustrated example, since a translation work is performed using the determined style information, it can be confirmed that the translation results (i.e., output sentences 104, 105) also follow the representative style information. For example, it can be confirmed that the Out 1 style vector of the translation result for the first sentence 102 generated based on the determined style vector of the original paragraph estimates representative style information, and the Out 2 style vector of the translation result for the second sentence 103 generated based on the determined style vector of the original paragraph also estimates representative style information. One example of a specific translation operation will be described later with reference to FIG. 7.

As such, the electronic apparatus 100 according to the present disclosure determines style information and performs machine translation using the determined style information. Thus, translation may be performed that maintains the style (tone, etc.) of the original text and that maintains the corresponding style throughout the sentences.

FIG. 1 and FIG. 2 illustrate and describe that a text is directly received and machine translation is performed but in implementation, a web page or a document including a text may be received, and the above-described operation may be applied to a voice recognition result regarding voice data including a user's uttered voice.

Although FIG. 2 illustrates that four types of style vectors are used, in some embodiments, only some of the four style vectors may be used, and a style vector other than the above-described style vectors may be used. In addition, in implementation, a style vector to be used for the corresponding sentence may be determined and the corresponding style only for the determined style vector may be maintained.

Figure 3:
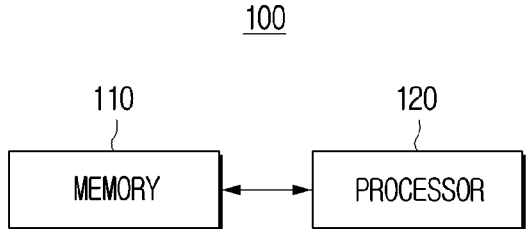
FIG. 3 is a block diagram illustrating a configuration of an electronic apparatus according to one or more embodiments.

FIG. 3 is a block diagram illustrating a configuration of an electronic apparatus according to one or more embodiments.

Referring to FIG. 3, the electronic apparatus 100 may include a memory 110 and a processor 120.

The memory 110 is a component for storing an operating system (O/S) for driving the electronic apparatus 100, various software, data, and the like. The memory 110 may be implemented in various forms such as a random access memory (RAM), a read-only memory (ROM), flash memory, hard disk drive (HDD), solid state drive (SSD), external memory, memory card, etc., but is not limited as such.

The memory 110 may store at least one instruction. Such an instruction may include an application that performs the above-described machine translation or various applications corresponding to functions that can be performed by the electronic apparatus 100.

The memory 110 may store a text of a first language. Alternatively, the text of the first language may be stored in a separate memory. The text may be received directly from the user, or may be a document such as a text, a web page, or a report used in various applications. Such a text may include a plurality of sentences.

Although a text has been described as being used, a vector value corresponding to the text may be used in implementation. The vector value may be generated using a predetermined encoding algorithm such as a Bidirectional Encoder Representations from Transformers (BERT) natural language processing model, a Robustly Optimized BERT Pretraining Approach (RoBERTa) natural language processing model, a T5 natural language processing model, etc. In implementation, any algorithm other than the above-described ones may be used as long as the algorithm can covert a text into a vector value for natural language processing.

The processor 120 may control each component of the electronic apparatus 100. The processor 120 may consist of a single device such as central processing unit (CPU) and application-specific integrated circuit (ASIC) or a plurality of devices such as CPU, graphics processing unit (GPU), etc.

When receiving a machine translation command, the processor 120 may machine-translate the input text of the first language into the text of the second language.

Specifically, the processor 120 may generate style information indicating the translation style to be applied in the machine translation. In this case, the processor 120 may generate style information to be commonly applied to a plurality of sentences (i.e., style information for each of the plurality of sentences) and may use an average value of each style vector in the calculated style information or use a weighted average value.

Alternatively, the processor 120 may generate style information by identifying a translation style applied to a first sentence from among a plurality of sentences or a sentence designated by the user. Such representative style information may be generated in units of paragraphs. In other words, when a plurality of paragraphs are included, the above-described operation of generating style information may be applied in units of paragraphs. In addition, style information may be commonly applied to the entire text (i.e., a plurality of paragraphs) at the time of implementation.

The processor 120 may generate a plurality of pieces of style information rather than single style information. Specifically, the processor 120 may distinguish a first sentence of a first style and a second sentence of a second style based on a predetermined symbol or a text layout included in the text, and generate first style information to be applied to the first style and second style information to be applied to the second style. For example, in a paragraph written in a literary style, there is a case where the words of a specific user are written as they are.

Alternatively, a text may be in a layout format according to a speaker (e.g., speaker 1: text 1; and speaker 2: text 2). Speaker 1 may use short words while speaker 2 uses honorific words. In this case, if all sentences are unified with the same short words or with honorific words, then the translation may be inaccurate or otherwise problematic. Accordingly, in the above case, text styles may be applied separately.

In addition, in implementation, a plurality of styles (in addition to or alternatively to the above described predetermined symbols and text layouts) may be used by comparing the above-described style information and representative style information. In other words, if the style information of the current sentence is similar to the representative style information, translation according to the representative style information may be performed. However, if the difference between the style information of the current sentence and the representative style information is large, which may indicate that it is highly likely that the writer deliberately changed the writing style of the original text, the style information of the corresponding sentence rather than the representative style information may be used. Such an example will be described later with reference to FIG. 10.

The processor 120 may machine-translate the text of the first language into the text of the second language using the generated style information. Specifically, the processor 120 may perform machine translation using a beam search method, and when calculating the score (e.g., a probability) of the beam search method, the previously calculated representative style information may be used.

When there are a plurality of pieces of style information regarding one sentence, the processor 120 may translate the sentence of the first style into the text of the second language using the first style information, and translate the sentence of the second style into the text of the second language using the second style information.

Machine translation implementing the above-described style information may be performed in various ways. Specifically, the processor 120 may generate a plurality of candidate translations for the sentence, and determine a candidate translation corresponding to the style information from among the candidate translations as the translation. Alternatively, in the process of generating a translation, machine translation may be performed by reflecting the style information in the process of generating each word or phrase. Such an operation will be described later with reference to FIG. 6.

Although FIG. 3 illustrates only simple configuration of the electronic apparatus 100, the electronic apparatus 100 may further include various components that are not illustrated in FIG. 3, which will be described below with reference to FIG. 4.

Figure 4:
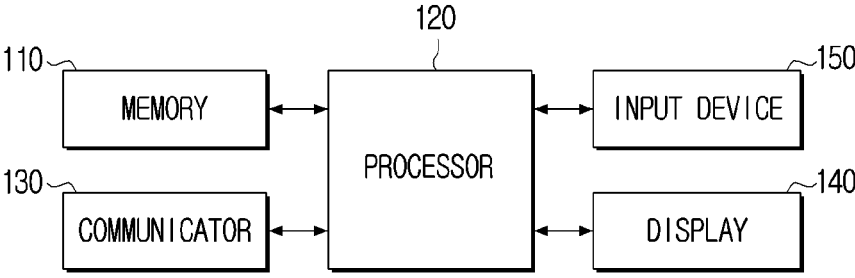
FIG. 4 is a block diagram illustrating a configuration of an electronic apparatus according to one or more embodiments.

FIG. 4 is a block diagram illustrating a configuration of an electronic apparatus according to one or more embodiments.

Referring to FIG. 4, the electronic apparatus 100 may include the memory 110, the processor 120, a communicator 130, a display 140, and an input device 150.

Since the memory 110 and the processor 120 have been described with reference to FIG. 3, repeated descriptions may be omitted.

The communicator 130 may be formed to connect the electronic apparatus 100 with an external device, and may be provided not only in the form where it is connected to the external device through a local area network (LAN) and an Internet network but also in the form where it is connected through a universal serial bus (USB) port or a wireless communication (e.g., WiFi 802.11a/b/g/n, near field communication (NFC), Bluetooth) port. Such a communicator 130 may be referred to as a transceiver.

The communicator 130 may receive a text. Alternatively, the communicator 130 may receive a content (e.g., a web page, a document, etc.) including the above-described text. Also, the above-described text may be a result of voice recognition.

The communicator 130 may transmit a translation result. For example, the electronic apparatus 100 according to the present disclosure may be implemented as a server, and when receiving a request for machine translation regarding the first language from an external device, may perform machine translation and transmit the result to the corresponding external device.

The display 140 may display a user interface window for receiving a selection of a function supported by the electronic apparatus 100. Specifically, the display 140 may display a user interface window for receiving a selection of various functions provided by an electronic apparatus 400.

Such a display 430 may be a monitor such as liquid crystal display (LCD), organic light emitting diodes (OLED), etc., or may be implemented as a touch screen capable of simultaneously performing some functions of the input device 150 that will be described later.

The display 140 may display machine translation results. In this case, the display 140 may display the original text and the machine translation result together.

The input device 150 may receive a control command regarding selection of a function of the electronic apparatus 100 and the corresponding function. Such an input device 150 may be a keyboard, a mouse, a touch pad, etc., and may include a microphone for receiving a user voice.

Although FIG. 4 further illustrates components different from those of FIG. 3 (e.g., a display, a user input device), only some of the above-described components may be further included as may be required or desired according to a particular implementation. In addition, the electronic apparatus 100 may further include components not illustrated in FIG. 4 (e.g., a microphone, a speaker, a camera, etc.).

Figure 5:
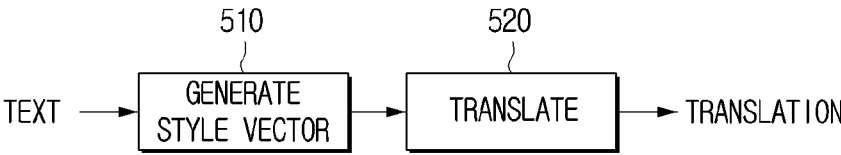
FIG. 5 is a diagram illustrating a machine translation operation according to one or more embodiments.

FIG. 5 is a diagram illustrating a machine translation operation according to one or more embodiments.

Referring to FIG. 5, a style vector generation operation 510 and a machine translation operation 520 are included.

Firstly, in the style vector generation operation 510, representative style information to be used in the translation process may be determined. Specifically, a style vector regarding each sentence included in the text may be calculated, and a style vector state to be applied to the entire paragraph may be determined based on the calculated style vector.

The style vector may be a degree of formality, a degree of politeness, informativeness, persuasiveness, and the like. In implementation, the above-described style vector may be calculated for each sentence, and a type of style vector to be applied to the entire paragraph and a degree value of the style vector may be calculated. For example, when a value having a high degree of honorific is calculated throughout the sentence and the other values are calculated to be not so high, it may be determined that only the style vector for the degree of honorific is applied. In addition, a value to be applied to the determined style vector (an average value or a weighted value for each sentence) may be determined.

As such, when representative style information is determined, machine translation can be performed by reflecting the determined style information in the machine translating operation 520. A method of reflecting such style information may be implemented in various ways. For example, a plurality of candidate translations may be generated in the translation process and one of the plurality of candidate translations may be selected by comparing style information of each of the plurality of translations and the representative style information. Alternatively, the translation may be performed in consideration of a style vector included in style information, which will be described later with reference to FIG. 7.

Figure 6:
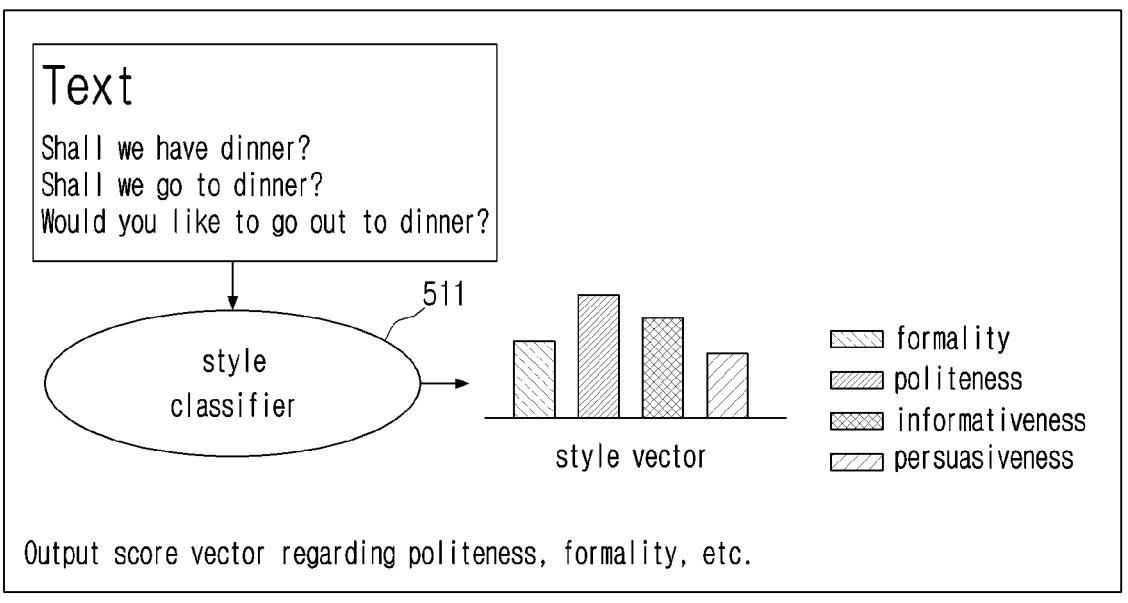
FIG. 6 is a diagram illustrating a method of generating style information to be applied to machine translation of a text according to one or more embodiments.

FIG. 6 is a diagram illustrating a method of generating style information to be applied to machine translation of a text according to one or more embodiments.

Referring to FIG. 6, four style vectors are depicted.

The first style vector is a degree of formality, which indicates the degree of honorific usage in a sentence. For example, the corresponding style vector may have different numerical values according to the degree of honorific. As illustrated in the example, with respect to the same sentence, there are sentences having different degrees of honorific, and the degree of honorific may be identified based on the words or predicates included in the sentences and the corresponding value can be calculated.

The second style vector is politeness information, and may have a higher value when a sentence is closer to a polite style and may have a lower value when a sentences is closer to an impolite style.

The third style vector is informativeness, which is a value indicating whether the corresponding sentence provides specific information. For example, a sentence providing objective information may have a high numerical value, and a sentence providing subjective opinion may have a low numerical value.

The fourth style vector is persuasiveness, which is a value indicating whether the corresponding sentence is a sentence for persuading a plurality of users. For example, a sentence for persuading others, such as dissertation, editorial, and the like, may have a high numerical value. In this case, the corresponding vector may be expressed as a value of 0 or 1.

Although the present disclosure illustrates four style vectors that could influence the style of a sentence, in implementation, other characteristics may be used in addition to the above-described style vectors may be used if they may affect the style of a sentence.

Although the style vector is expressed as a vector in the above description, the style vector is expressed as a numerical value. In other words, the above-described style vector may also be referred to as a style factor, a style value, a style degree, and the like.

As such, the representative style information may be generated by calculating the above-described four style vectors for each sentence unit and determining the degree of the style vector to be applied to the entire paragraph using the style vector of each of a plurality of sentences.

Although using all of the four style vectors is illustrated and described in the above, in implementation, not all of the above-described style vectors are used and only some style vectors to be commonly applied to the corresponding paragraph may be determined and used. Alternatively, as long as the style of a text can be specified, things other than the above-described four style vectors may be used.

In the above, it is described that style information is generated by calculating a style vector, but in implementation, the type of writing of a text may be identified and style information may be generated based on the identified type of writing. For example, editorials, manuals, newspaper articles, etc. have a specific style for each type of writing. Accordingly, style information corresponding to the type of writing may be used. In order to identify the type of writing, it is possible to use a predetermined AI algorithm, and it is also possible to identify the type of writing using the source of a text, etc.

Figure 7:
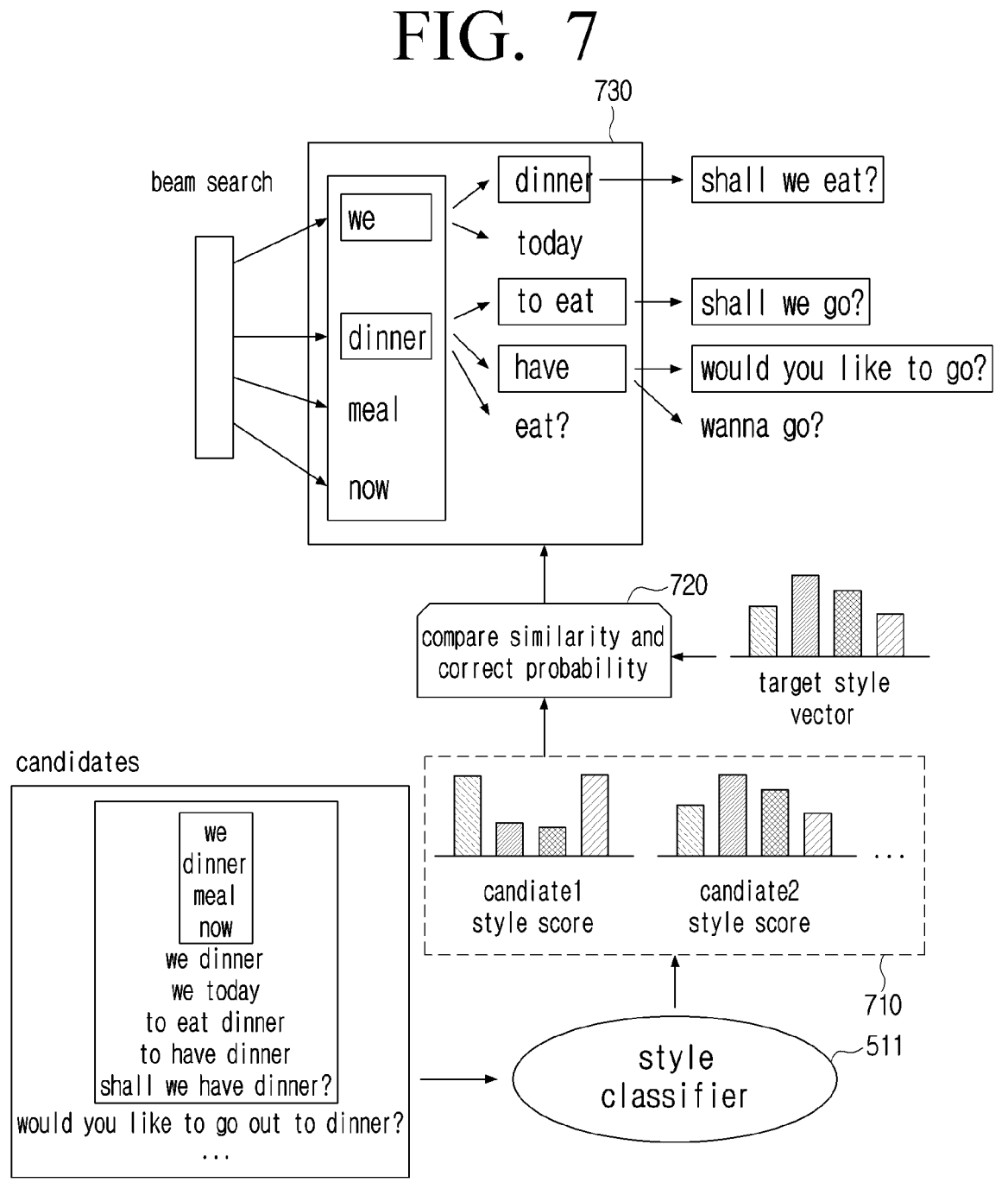

FIG. 7 is a diagram illustrating a machine translation operation based on generated style information according to one or more embodiments.

FIG. 7 is a diagram illustrating a machine translation process regarding "shall we get dinner?" and "there will be a welcome speech." When these two sentences are input, style information 710 of each sentence may be identified using a style classifier 511, and representative style information to be commonly applied to the two sentences may be determined. For example, since a somewhat formal or honorific sentence using "shall we—" is used, a style vector corresponding to the use of such a phrase may be calculated.

When such representative style information is calculated, machine translation may be performed using a beam search method. A beam search method 730 may refer to a method of generating translations while increasing tokens one by one in the process of generating translations. In the process of determining tokens, the probability (e.g., a score) of each candidate for the corresponding token is used.

When calculating such probability (or score), the above-described style vector is reflected. That is, the electronic apparatus may compare similarity and correct probability at operation 720. For example, when "dinner" is determined and there are "to eat", "to have" and "wanna eat?" as candidates for the next token as illustrated in FIG. 7, when calculating the probability (e.g., a score) for each candidate, a candidate matching the value corresponding to the style vector may be determined.

As such, the present disclosure describes that a machine translation operation is performed in a beam search method but in implementation, a machine translation operation may be performed in a method other than the beam search method.

FIG. 8 is a diagram illustrating an example of a generated machine translation result according to one or more embodiments.

FIG. 8 illustrates a text 810 of the first language and a machine translation result 820 of the corresponding text.

Referring to the machine translation result, it is confirmed that the end words of each sentence maintain the same style, such as "decreased", "reported" and "did."

As such, when machine translation is performed in a method according to the present disclosure, the translation style between sentences is maintained and thus, consistency within a paragraph may be maintained. In addition, since various styles (tone, speech, parlance, locution etc.) included in the original text can be reflected, a higher-quality translation result may be provided.

Figure 9:
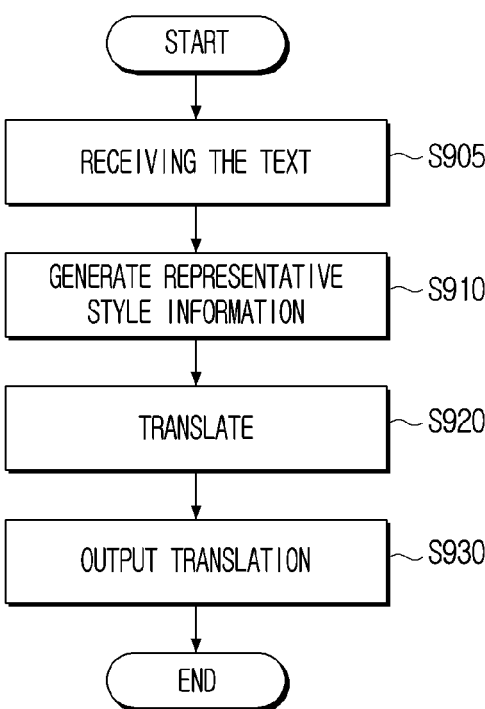
FIG. 9 is a flowchart illustrating a controlling method of another electronic apparatus according to one or more embodiments.

FIG. 9 is a flowchart illustrating a controlling method of another electronic apparatus according to one or more embodiments.

Referring to FIG. 9, in operation S905, a text of the first language is received. Specifically, the text may be received from an external device, the text may be directly received through an input device provided in the electronic apparatus 100, or the text may be received as a text applied to another application is pasted, etc.

Subsequently, representative style information indicating a translation style to be applied to the machine translation of the text of the first language is generated in operation S910. For example, when the text includes a plurality of sentences, style information to be commonly applied to the plurality of sentences may be generated using the plurality of sentences. Alternatively, style information may be generated by checking a translation style to be applied to a first sentence from among a plurality of sentences or a sentence designated by a user.

There is a case in which the writer intentionally writes sentences in different styles. For example, there may be a case in which the words of a specific speaker are quoted as they are (e.g., within a punctuation mark such as " ") or there may be a script or movie lines. As such, even when the writer intentionally distinguishes sentences with different styles, in order to perform translation corresponding to each style, if a predetermined symbol (e.g., " ") is included in a sentence or there is a text layout having a form such as "name: text", sentences in a text may be divided into a plurality of sentences and different style information may be generated for each divided sentence.

The style information may include a style vector indicating at least one of a degree of honorific, a degree of formality, a degree of colloquialism, informativeness, and persuasiveness. Since the characteristics of each style vector have been described above, overlapping description will be omitted.

The text of the first language is machine-translated into the text of the second language using the generated style information in operation S920. Specifically, a plurality of candidate words or phrases may be determined in the process of translating words or phrases included in a text, a style vector of each candidate word or phrase may be identified, and the text of the first language may be translated into the text of the second language by comparing the style vector of each candidate word or phrase with the style information to determine a word or phrase to be applied to the text.

Subsequently, the machine translation result may be output in operation S930. Specifically, the machine translation result may be displayed or transmitted to an external device.

As such, in a controlling method of an electronic apparatus according to the present disclosure, machine translation may proceed while maintaining a translation style in a paragraph. In addition, machine translation may be performed by maintaining the style (tone, etc.) of the original text.

Figure 10:
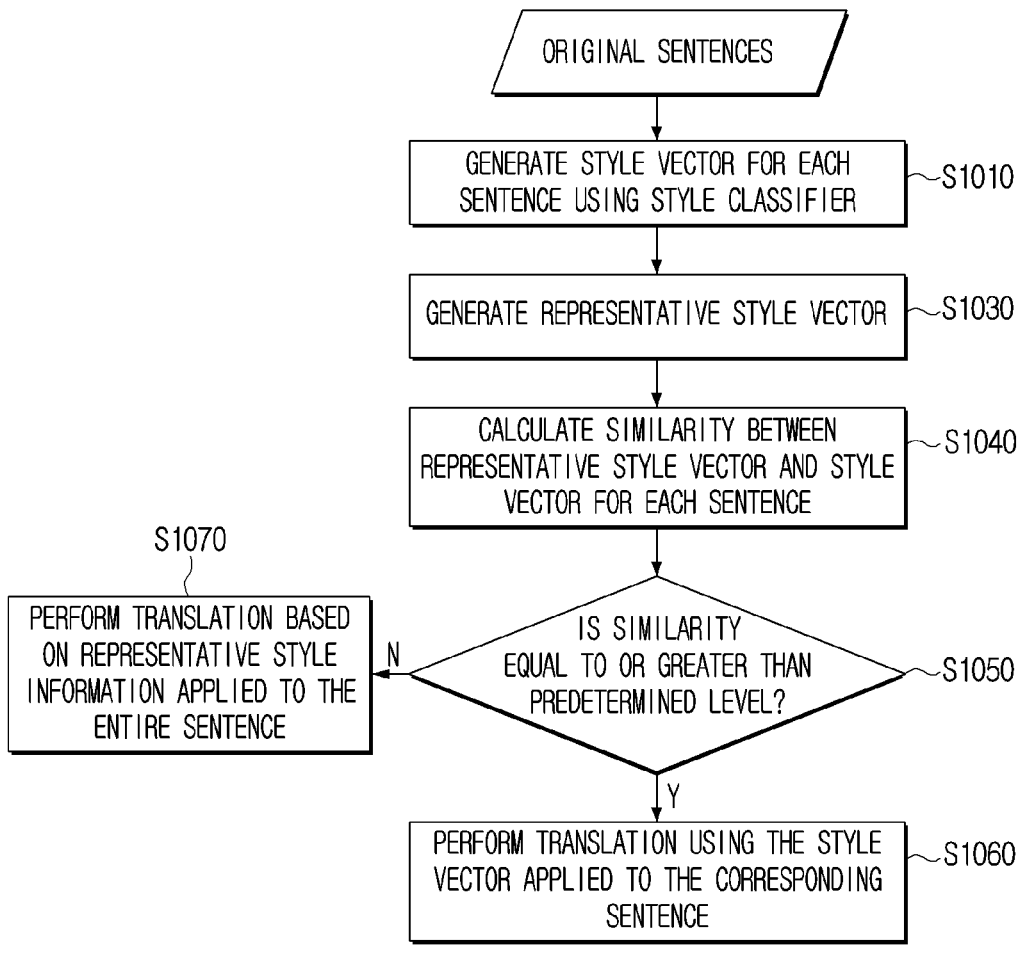
FIG. 10 is a flowchart illustrating a machine translation method of an electronic apparatus according to one or more embodiments.

FIG. 10 is a flowchart illustrating a machine translation method of an electronic apparatus according to one or more embodiments. Hereinafter, it is assumed that a text including a plurality of sentences is input for convenience of explanation.

When a text including a plurality of sentences is input, a style vector for each sentence is generated in operation S1010.

In operation S1030, a representative style vector (e.g., an average, a weighted average, a convolution, etc.) may be generated. Style information to be applied to the entire sentence may be determined using the style vector of the representative sentence as style information or using the average or weighted average of the style vector applied to each sentence. If only one sentence is included or the user designates one sentence, style information for the corresponding sentence may be used as representative style information.

The determined style information to be applied to the entire sentence and the style vector for each sentence are compared in operation S1040.

It may be determined whether the similarity is equal to or greater than a predetermined value in operation S1050. If the difference between the two is less than a predetermined value (S1050—Y) (i.e., if the style vector applied to the current sentence is similar to the style information applied to the entire sentence) translation using the style vector applied to the corresponding sentence may be performed in operation S1060.

If the difference is equal to or greater than a predetermined value (S1050—N) as a result of comparison, translation may be performed based on the representative style information applied to the entire sentence rather than the style vector applied to the current sentence in operation S1070.

Terms "~er/or" or "module" used in the disclosure may include units configured by hardware, software, or firmware, and may be used compatibly with terms such as, for example, logics, logic blocks, components, circuits, or the like. The "unit" or "module" may be an integrally configured component or a minimum unit performing one or more functions or a part thereof. For example, the module may be configured by an application-specific integrated circuit (ASIC).

Various embodiments of the disclosure may be implemented by software including instructions stored in a machine-readable storage medium (for example, a computer-readable storage medium). A machine is a device capable of calling a stored instruction from a storage medium and operating according to the called instruction, and may include the electronic apparatus of the disclosed embodiments. In the case in which the above-described command is executed by the processor, the processor may directly perform a function corresponding to the command or other components may perform the function corresponding to the above-described command under a control of the processor. The command may include codes created or executed by a compiler or an interpreter. The machine-readable storage medium may be provided in a form of a non-transitory storage medium. The term "non-transitory" may refer to that the storage medium is tangible without including a signal, and does not distinguish whether data are semi-permanently or temporarily stored in the storage medium.

According to one or more embodiments, the methods according to various embodiments disclosed in the present document may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, Play-Store™). In case of the online distribution, at least a portion of the computer program product may be at least temporarily stored in a storage medium such as a memory of a server of a manufacturer, a server of an application store, or a relay server or be temporarily generated.

Each of components (for example, modules or programs) according to various embodiments described above may include a single entity or a plurality of entities, and some of the corresponding sub-components described above may be omitted or other sub-components may be further included in the diverse embodiments. Alternatively or additionally, some components (e.g., modules or programs) may be integrated into one entity and perform the same or similar functions performed by each corresponding component prior to integration. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic apparatus comprising:
a memory configured to store instructions; and
a processor configured to execute the instructions to:
receive a text of a first language;

generate, based on the text of the first language, style information indicating a translation style to be applied to the text of the first language; and machine-translate the text of the first language into text of a second language based on the generated style information, wherein the generated style information comprises an average value style vector or a weighted average value style vector between a first style vector of a first portion of the text of the first language and a second style vector of a second portion of the text of the first language, and wherein the processor is further configured to machine-translate the text of the first language based on a beam search method that comprises the operations of:

determining tokens for the text of the first language;

determining candidates for the tokens based on candidates matching a value corresponding to the average value style vector or the weighted average value style vector.

2. The electronic apparatus of claim 1, wherein the text of the first language comprises a plurality of sentences, and wherein the processor is further configured to execute the instructions to generate the style information based on the plurality of sentences, the style information being commonly applied to machine translation of the plurality of sentences.

3. The electronic apparatus of claim 2, wherein the processor is further configured to execute the instructions to:

distinguish a first sentence of a first style and a second sentence of a second style based on a predetermined symbol included in the text of the first language or a text layout;

generate first style information to be applied to the first style and second style information to be applied to the second style;

translate a sentence of the first style into the second language based on the first style information; and translate a sentence of the second style into the second language based on the second style information.

4. The electronic apparatus of claim 1, wherein the text of the first language comprises a plurality of sentences, wherein the processor is configured to execute the instructions to generate the style information by:

generating third style information of each of the plurality of sentences; and determining representative style information based on the third style information; and wherein the processor is configured to execute the instructions to machine-translate the text of the first language by:

identifying a similarity between the representative style information and the third style information;

translating a sentence within a predetermined similarity range into the second language based on the representative style information; and translating a sentence outside the predetermined similarity range into the second language based on fourth style information of the sentence outside the predetermined similarity range.

5. The electronic apparatus of claim 1, wherein the first style vector and the second style vector indicate at least one of a degree of honorific, a degree of formality, a degree of colloquialism, a degree of informativeness, and a degree of persuasiveness.

6. The electronic apparatus of claim 1, wherein the processor is further configured to execute the instructions to:

determine a degree of honorific of the text of the first language based on words, final words and idioms included in the text of the first language; and machine-translate the text of the first language into the text of the second language based on the determined degree of honorific.

7. The electronic apparatus of claim 1, wherein the processor is further configured to execute the instructions to:

classify, based on the text of the first language, a type of the text of the first language; and generate the style information based on the classified type of the text of the first language.

8. The electronic apparatus of claim 1, wherein the processor is further configured to execute the instructions to:

generate candidate sentences of the second language with respect to each sentence included in the text of the first language;

generate fifth style information of each of the candidate sentences of the second language; and determine one of the generated plurality of candidate sentences as the text of the second language based on the fifth style information of each of the candidate sentences and sixth style information indicating the translation style.

9. The electronic apparatus of claim 1, wherein the processor is further configured to execute the instructions to:

determine a plurality of candidate words or phrases included in the text of the first language;

identify a style vector of each of the plurality of candidate words or phrases; and determine words or phrases to be applied to the text of the first language by comparing the style vector of each of the plurality of candidate words or phrases with the generated style information.

10. The electronic apparatus of claim 1, wherein the text of the first language comprises a plurality of paragraphs, each comprising a plurality of sentences, wherein the processor is configured to execute the instructions to generate the style information in units of the plurality of paragraphs; and wherein the processor is configured to execute the instructions to machine-translate the text of the first language into the text of the second language based on the generated style information that is generated in units of the plurality of paragraphs.

11. The electronic apparatus of claim 1, further comprising:

a display, wherein the processor is further configured to execute the instructions to control the display to display the text of the second language.

12. The electronic apparatus of claim 1, further comprising:

a communicator configured to receive text, wherein the processor is further configured to execute the instructions to control the communicator to transmit the text of the second language to an external device that has transmitted the text of the first language to the electronic apparatus.

13. A method of an electronic apparatus, comprising:

receiving a text of a first language;

generating, based on the text of the first language, style information indicating a translation style to be applied to the text of the first language; and machine-translating the text of the first language into text of a second language based on the generated style information, wherein the generated style information comprises an average value style vector or a weighted average value style vector between a first style vector of a first portion of the text of the first language and a second style vector of a second portion of the text of the first language, and wherein machine-translating the text of the first language is performed based on a beam search method that comprises the operations of:

determining tokens for the text of the first language;

determining candidates for the tokens based on candidates matching a value corresponding to the average value style vector or the weighted average value style vector.

14. The method of claim 13, wherein the text of the first language comprises a plurality of sentences, wherein the generating the style information comprises:

generating first style information of each of the plurality of sentences; and determining representative style information based on the first style information, and wherein the machine-translating comprises:

identifying a similarity between the representative style information and the first style information of each of the plurality of sentences;

translating a sentence within a predetermined similarity range into the second language based on the representative style information; and translating a sentence outside the predetermined similarity range into the second language based on second style information of the sentence outside the predetermined similarity range.

15. A non-transitory computer-readable recording medium storing instructions that, when executed by at least one processor, cause the at least one processor to:

receive a text of a first language;

generate style information indicating a translation style to be applied to the text of the first language; and machine-translate the text of the first language into text of a second language based on the generated style information, wherein the generated style information comprises an average value style vector or a weighted average value style vector between a first style vector of a first portion of the text of the first language and a second style vector of a second portion of the text of the first language, and wherein the instructions, when executed by the at least one processor, cause the at least one processor to machine-translate the text of the first language based on a beam search method that comprises the operations of:

determining tokens for the text of the first language;

determining candidates for the tokens based on candidates matching a value corresponding to the average value style vector or the weighted average value style vector.

16. The method of claim 13, wherein the first style vector and the second style vector indicate at least one of a degree of honorific, a degree of formality, a degree of colloquialism, a degree of informativeness, and a degree of persuasiveness.

17. The method of claim 13, further comprising:

determining a degree of honorific of the text of the first language based on words, final words and idioms included in the text of the first language; and machine-translating the text of the first language into the text of the second language based on the determined degree of honorific.

18. The method of claim 13, further comprising:

classifying, based on the text of the first language, a type of the text of the first language; and generating the style information based on the classified type of the text of the first language.

19. The method of claim 13, further comprising:

generating candidate sentences of the second language with respect to each sentence included in the text of the first language;

generating third style information of each of the candidate sentences of the second language; and determining one of the generated plurality of candidate sentences as the text of the second language based on the third style information of each of the candidate sentences and fourth style information indicating the translation style.

20. The method of claim 13, further comprising:

determining a plurality of candidate words or phrases included in the text of the first language;

identifying a style vector of each of the plurality of candidate words or phrases; and determining words or phrases to be applied to the text of the first language by comparing the style vector of each of the plurality of candidate words or phrases with the generated style information.

* * * * *